United States Patent [19]

Rodman et al.

[11] 4,136,896
[45] Jan. 30, 1979

[54] FLARELESS TUBE FITTING FOR 37° ADAPTER

[75] Inventors: Michael R. Rodman, Haviland, Ohio; Paul M. Holmes; Joseph Habib, both of Jackson, Mich.

[73] Assignee: Aeroquip Corporation, Jackson, Mich.

[21] Appl. No.: 852,673

[22] Filed: Nov. 18, 1977

[51] Int. Cl.² .............................................. F16L 19/08
[52] U.S. Cl. .................................. 285/341; 285/382.7
[58] Field of Search .................... 285/382.7, 343, 342, 285/341

[56] References Cited

U.S. PATENT DOCUMENTS

| 2,641,487 | 6/1953 | La Marre | 285/382.7 X |
| 2,693,374 | 11/1954 | Wurzburger | 285/382.7 X |
| 2,693,375 | 11/1954 | Wurzburger | 285/382.7 X |
| 2,693,377 | 11/1954 | Wurzburger | 285/382.7 X |
| 2,807,481 | 9/1957 | Main, Jr. | 285/382.7 X |
| 2,823,935 | 2/1958 | Wurzburger | 285/343 X |
| 2,930,635 | 3/1960 | Woodling | 285/341 |
| 2,943,871 | 7/1960 | St. Clair | 285/382.7 X |
| 3,970,337 | 7/1976 | Niemeyer | 285/382.7 X |

Primary Examiner—Thomas F. Callaghan
Attorney, Agent, or Firm—Beaman & Beaman

[57] ABSTRACT

A fitting for connecting a metal conduit to a conventional 37° flared adapter which does not require flaring of the conduit, and constitutes a compression type fitting utilizing a radially contractable ferrule and compression nut. Metal-to-metal sealing contact is achieved, and no modification of the conduit is required.

2 Claims, 3 Drawing Figures

FLARELESS TUBE FITTING FOR 37° ADAPTER

BACKGROUND OF THE INVENTION

The invention pertains to conduit fittings of the compression type usuable with a conventional flared fitting.

The well-known flared fitting is commonly employed in conduit systems, particularly those using soft metal conduit, such as copper tubing, and a flaring tool is utilized to form an annular flange on the end of the conduit which is held in metal-to-metal engagement with a conical surface designed on an adapter by means of a threaded nut mating with threads formed on the adapter.

While flared fittings are commonly employed for many types of installations, the formation of the flange is troublesome and time consuming, and must be carefully accomplished if a fluid tight connection is to be achieved. Considerable skill is required by the operator in forming the flared flange when done with hand tools at on-site locations and flared flanges cannot readily be made in close quarters.

Also, as the flared flange overlaps the conical sealing surface defined on the cooperating adapter fitting, in installations where two coaxially aligned flared conduits are interconnected by a conventional coupling or Tee the spacing between the ends of the conduits is less than the actual axial length of the coupling or Tee and difficulty is encountered in installing the same and preventing cross threading of the nuts.

While conduit fittings have been proposed for use with conventional flared adapters which do not employ a flared surface on the conduit, as shown in U.S. Pat. No. 2,930,635, such prior art devices require the use of a contractable ferrule mounted upon the conduit which is not freely axially positionable thereon, and clearance problems such as those described above still exist when utilizing this type of flareless fitting for interconnecting a pair of aligned conduits.

BRIEF DESCRIPTION OF THE INVENTION

It is an object of the invention to produce a compression type fitting for metal conduits which requires no shaping of the conduit end, yet permits the conduit to be attached to a conventional flared fitting adapter employing metal-to-metal sealing.

A further object of the invention is to provide a compression type fitting for use with a conventional flared adapter wherein, prior to attachment, the fitting does not extend beyond the end of the conduit, and no portion of the fitting is in a superimposed or telescoped relationship to the adapter prior to interconnection.

Yet another purpose of the invention is to provide a flareless fitting connection for conduits permitting assembly to a conventional flared adapter wherein metal-to-metal sealing occurs throughout the fitting and no nonmetallic components are employed.

A further object of the invention is to provide a flareless tube fitting for connection to a conventional flared adapter wherein the fitting utilizes a contractable ferrule having a hinged wall portion, and improper orientation of the ferrule within the compression nut prevents assembly of the fitting to the adapter.

In the practice of the invention the flareless tube fitting utilizes only a radially contractable annular ferrule and a compression nut. The compression nut employs threads for mating with the threads of a conventional flared adapter, and the bore of the nut includes a ferrule receiving section and a reduced diameter portion closely receiving the tube. An annular ferrule is slipped on the tube end after the nut has been placed thereon, and the ferrule includes a body member portion having a minimum diameter slightly greater than the diameter of the tube and a thin walled hinge portion terminating in a sealing region having at least one annular lip or rib in radial opposition to a cam surface which cooperates with a cam surface defined on the compression nut. The ferrule is also provided with a conical adapter engaging sealing surface of an angle complimentary to the sealing surface defined upon the fitting adapter nose.

In use, the end of the tube is disposed adjacent and in line with the end of the flared adapter fitting after the nut and ferrule have been placed thereon. Threading of the nut upon the threads of the adapter first engages the conical surface of the ferrule with the adapter nose surface, and continued rotation and axial displacement of the nut compresses the seal region of the ferrule contracting the same causing the annular lip to embed into the tube in a sealing relationship therewith.

As the nut and ferrule may be initially located on the tube "behind" the tube end, fittings in accord with the invention may be utilized in rigid conduit systems to interconnect conduits with conventional flared couplings and Tees wherein no bending of the conduits is required in order to install the flared fitting. The flared fitting length will be slightly less than the length separating the opposed ends of the aligned conduits and the coupling or Tee may merely be aligned with the conduits and the compression nuts threaded thereon since the engagement of the ferrule with the nose surface of the flared fitting only occurs during the tightening of the nut.

BRIEF DESCRIPTION OF THE DRAWINGS

The aforementioned advantages and objects of the invention will be appreciated from the following description and accompanying drawings wherein.

DESCRIPTION OF THE PREFERRED EMBODIMENT

Figure 1:
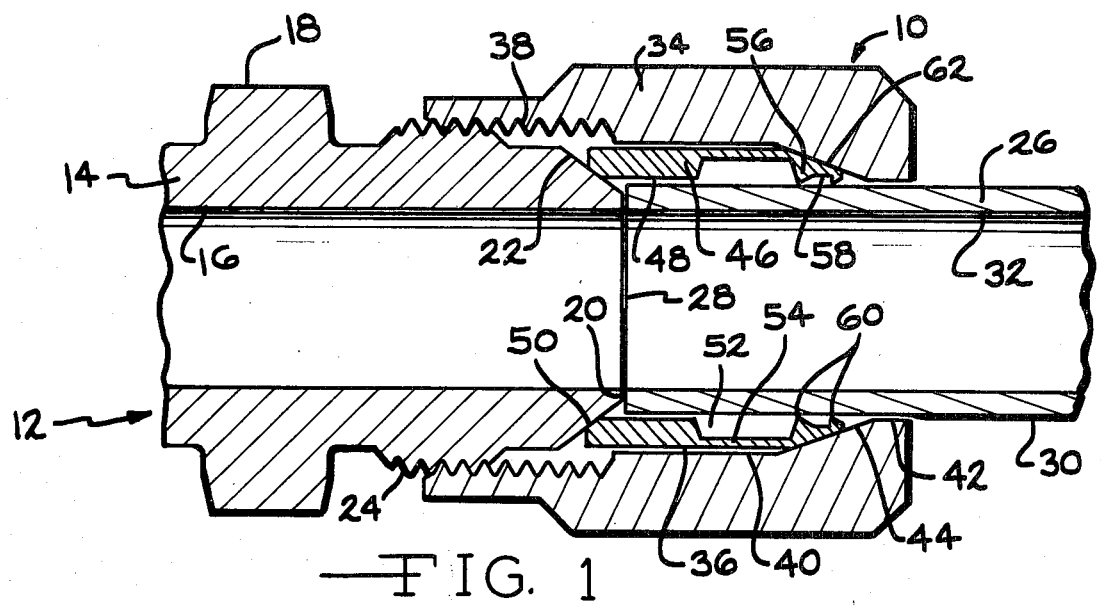
FIG. 1 is an elevational sectional view of a fitting constructed in accord with the invention upon the nut being initially threaded upon a flared adapter and prior to compression of the ferrule.

The flareless tube fitting in accord with the invention is generally indicated at 10, and this fitting is adapted to be interconnected to a conventional flared adapter generally indicated at 12.

The adapter 12 includes an annular body 14 having a coaxial cylindrical bore 16. The body 14 may have a complete configuration of various types, such as an elbow, a plurality of outlets, a Tee, a coupling having identical threads and nose surfaces defined at opposite end, or other conventional flared fitting form. The conventional flared fitting usually includes a hexagonal wrench engaging portion 18, and the nose end is defined at 20.

The nose end includes a conical nose surface 22 formed at 37° which forms a sealing surface with the tube flare in a conventional flared connection, and the adapter utilizes external threads 24 for receiving the threads of the compression nut of the tube fitting.

The tube or conduit 26, is of metal, and may be copper, aluminum or steel, and includes a squared end 28, a cylindrical outer surface 30 and a bore 32. As will be appreciated from the drawing, the diameter of the bore 32 will normally be identical to the adapter bore 16.

The fitting 10 consists of two components, the compression nut 34 and the radially contractable ferrule 36. The compression nut 34 is of an annular configuration externally provided with hexagonally arranged wrench engaging flats and is provided with an internal bore having three separate portions. The nut bore includes internal threads 38 adapted to cooperate with the adapter threads 24, and the central portion of the nut bore comprises a cylindrical ferrule receiving portion 40 which merges into a reduced diameter bore portion 42 of a diameter only slightly greater than that of the tube surface 30. The central portion 40 includes a conical cam surface 44 converging in a direction toward the bore portion 42 for compressing the ferrule, as will be later described.

The annular ferrule 36 is formed of metal, usually of a hardness greater than that of the tube 26, and the ferrule includes a cylindrical body portion 46 defining the maximum ferrule wall thickness and is inwardly defined by the cylindrical surface 48, which is of a diameter greater than the tube diameter 30. The ferrule body 46 also includes a conical seal surface 50 disposed at the 37° angle complementary to the angular relationship of the adapter nose surface 22.

The ferrule 36 is recessed at 52 to define a hinge wall portion 54 of significantly reduced radial wall dimension as compared with the ferrule body 46, and the inner end of the hinge wall portion 54 is provided with a seal portion 56 having a cylindrical inner diameter 58. Two annular radially inwardly projecting lips or ridges 60 are defined on the seal portion 56 extending from the surface 58, and these lips are provided with a sharp inner edge to facilitate embedding into the tube 26. The seal portion 56 also includes a conical cam surface 62, and in opposed radial relationship to the lips or ridges 60.

To connect the tubing 26 to the adapter 12 it is only necessary to cut the tube to the desired length to form the squared end 28. It is to be noted that it is not critical to the operation of the fitting of the invention that the end 28 be perpendicular to the axis of the tube, or parallel to the adapter end 20, since no sealing occurs at the tube end. The fact that no sealing occurs at this location permits the fitting of the invention to be used with tubing which may have burrs or deformations at the tube end and secondary operations and cleaning of the tube end are not as critical as with known flareless fittings.

Once the tube 26 has been cut to the desired length, the nut 34 and ferrule 36 are slipped over the tube. As the minimum diameter of the nut, as defined by bore portion 42 is greater than the tube surface diameter 30, and as the minimum diameter of the ferrule 36 as defined by the edges of the lips 60 is also greater than the diameter of the tube 30, both the nut and ferrule may be positioned on the tube 26 well "back" from the end 28 so that when the tube 26 is aligned with the adapter 12 neither the nut or the ferrule create clearance or assembly problems. This feature of the invention is significant when the fitting is used with rigidly mounted conduit systems as it permits the adapter to be coaxially aligned with the tube 26 without bending of the tube. For instance, wherein a pair of conduits 26 are rigidly mounted, or it is desired to insert a Tee fitting into an existing conduit line, the adapter, either in the form of a coupling or a Tee, may be directly aligned with the tubing as long as the spacing between the opposed tube ends 28 is slightly greater than the length of the adapter. To install conventional flared fittings in a rigid conduit system is difficult due to the radial overlapping of the adapter nose surface and the flared portion of the conduit which necessitates bending of the conduit in order to place it upon the adapter nose, and such aligning often results in cross threading the compression nut.

Once the tube 26 and adapter 12 are aligned, the nut 34 is slid along the tube toward the adapter until the threads 38 engage the adapter threads 24. This movement of the nut will cause the cam surface 44 to engage the ferrule cam surface 62 locating the ferrule within the nut bore portion 40 and move the ferrule along the tube with the nut. As the nut is threaded upon the threads 24 the ferrule surface 50 will engage the adapter nose surface 22 and center itself thereon. As the compression nut 34 is rotated and axially moved to the left relative to tube 26, FIG. 1, the nut cam surface 44 will radially deflect the ferrule seal portion 56 inwardly due to the hinging that occurs in the ferrule wall 54, and as the nut is tightened to completion the lips will fully embed into the tube 26 as illustrated in FIG. 2.

Figure 2:
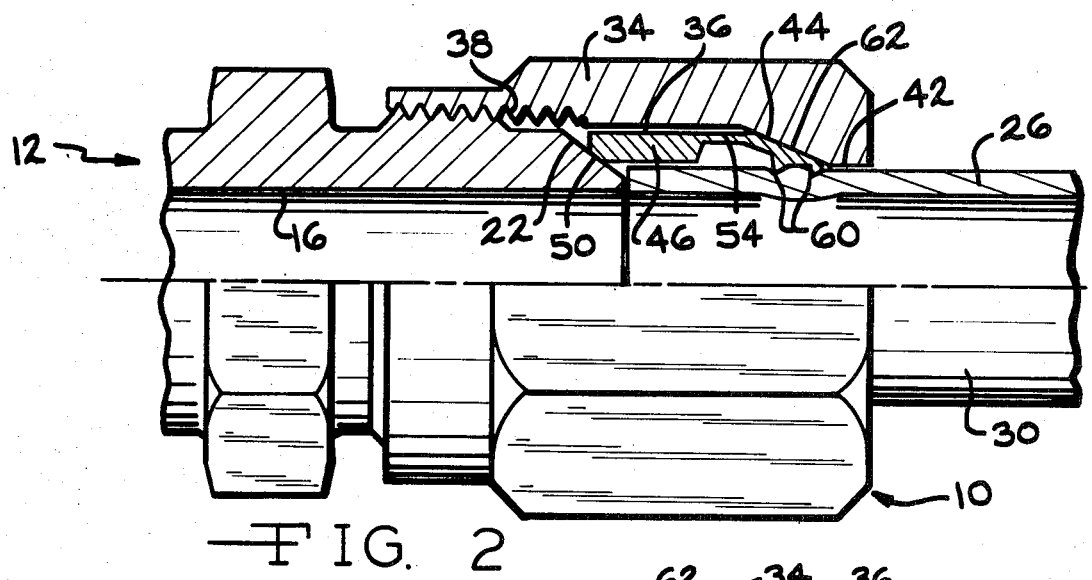
FIG. 2 is an elevational view, the top half being in section, illustrating the relationship of the fitting and adapter in accord with the invention at the completion of the assembly of the fitting on the adapter and, FIG. 3 is an elevational view, partially in section, illustrating the relationship of the components preventing assembly of the fitting in the event the ferrule is improperly placed upon the conduit.

The fully assembled relationship between flareless fitting and adapter 12 is shown in FIG. 2 and due to the engagement of surface 50 with adapter surface 22, and the embedding of the lips 60 into the tube 26 metal-to-metal-sealing contact between the tube and adapter has been accomplished, and as no elastomeric material is used in the fitting the fitting is capable of withstanding high temperatures without deterioration.

Figure 3:
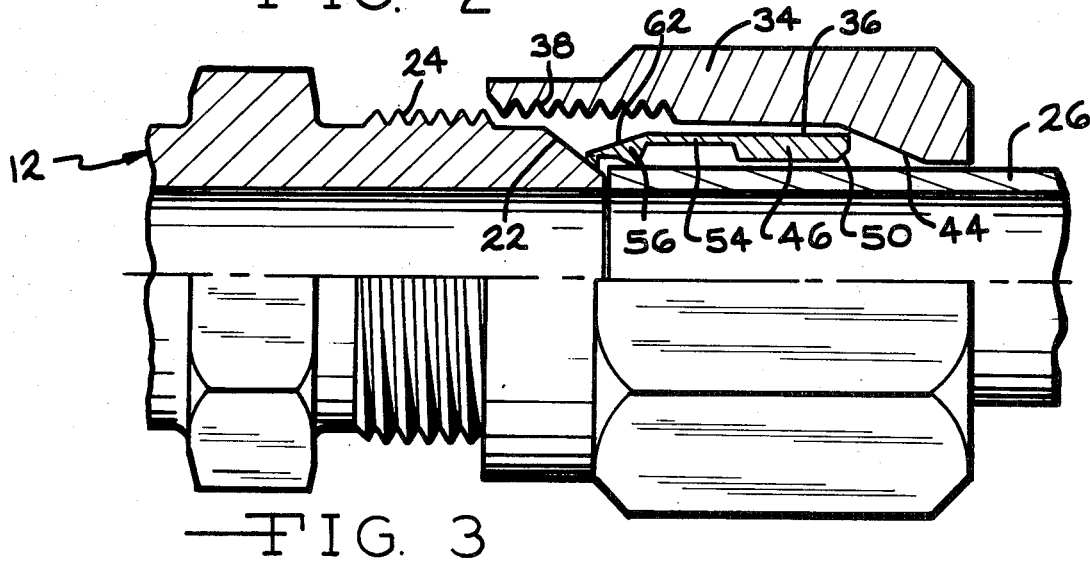

From FIG. 2 it will be appreciated that the axial length of the ferrule 36 is substantially identical to the axial length of the compression nut central bore portion 40. This dimensional relationship permits the fitting component to be assembled in the above described manner, and if the ferrule 36 should inadvertently be placed on the tube 26 in a reversed position, as shown in FIG. 3, interference between the ferrule body 46 and the nut surface 44, and the seal portion 56 with the adapter surface 22, prevents the adapter and nut threads from mating, FIG. 3, immediately indicating to the user that the ferrule is placed on the tube incorrectly, and this feature of the invention renders the fitting "foolproof" with respect to assembly to a conventional 37° flared adapter.

It is appreciated that various modifications to the inventive concept may be apparent to those skilled in the art without departing from the spirit and scope of the invention.

We claim:

1. A flareless tube coupling for a cylindrical tube comprising, in combination, an adapter having external threads, an external conical nose surface extending outwardly from the end of the adapter and an interior bore concentric with said nose surface, a nut of annular configuration having an internal bore including a threaded region adjacent one end having an outer end and adapted to engage the threads of said adapter, a central ferrule receiving region, and a reduced diameter region adjacent the other end, an annular ferrule within said nut central region, said ferrule including a primary body portion having a substantially cylindrical outer wall and having a minimum inner diameter greater than the outer diameter of the tube and having first and second ends, said ferrule body portion having an annular conical adapter nose engaging surface defined at said first end of an angular orientation complimentary to the angle of said adapter nose surface and an annular axially extending hinge wall of reduced wall thickness projecting from said second end adjacent said ferrule body portion outer wall having an outer cylindrical surface constituting an extension of said body portion outer wall, an annular seal portion defined on said hinge wall axially spaced from said body second end having an inner surface and an outer surface, at least one radially inwardly projecting annular lip defined on said inner surface adapted to sealingly engage the tube, a first conical cam surface defined on said outer surface in radial alignment with said lip, and a second conial cam surface defined upon said nut at said central region axially overlapping and engaging said first cam surface upon threading of said nut upon said adapter threads to radially deform said ferrule seal portion inwardly establishing a seal between said lip and the tube and axially forcing said ferrule body nose engaging surface into a sealing engagement with said adapter nose surface, the axial length of said ferrule being greater than the axial distance between said second cam surface and adapter nose surface which permits the outer end of said nut threaded region to engage said adapter threads whereby said ferrule must be placed in said nut central region with said first and second cam surfaces overlapping and engaging to permit engagement of said adapter threads with said nut threaded region outer end and reversal of said ferrule within said nut central region prevents engagement of said adapter threads with said nut threaded region outer end.

2. In a flareless tube fitting as in claim 1 wherein the axial length of said ferrule is substantially equal to the length of said nut central ferrule receiving region.

* * * * *